(12) United States Patent
Yokoyama et al.

(10) Patent No.: US 8,196,989 B2
(45) Date of Patent: Jun. 12, 2012

(54) SEAT COWL STRUCTURE OF SADDLE-RIDING TYPE VEHICLE

(75) Inventors: Takeo Yokoyama, Saitama (JP);
Yoshiyuki Kurayoshi, Saitama (JP);
Masashi Hagimoto, Saitama (JP);
Sumio Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/877,645

(22) Filed: Sep. 8, 2010

(65) Prior Publication Data
US 2011/0074177 A1  Mar. 31, 2011

(30) Foreign Application Priority Data

Sep. 30, 2009  (JP) .................................. 2009-227598

(51) Int. Cl.
*B60N 2/24* (2006.01)
(52) U.S. Cl. ........................... 296/66; 296/78.1; 280/835
(58) Field of Classification Search .................. 296/191, 296/192, 63, 66, 78.1; 280/833, 831, 835
See application file for complete search history.

(56) References Cited

U.S. PATENT DOCUMENTS

| 6,419,273 B1 * | 7/2002 | Iizuka et al. | 280/833 |
| 6,910,716 B2 * | 6/2005 | Kurayoshi et al. | 280/835 |
| 7,484,767 B2 * | 2/2009 | Tsuya | 280/835 |

FOREIGN PATENT DOCUMENTS

| JP | 3-271087 A | | 12/1991 |
| JP | 2003112678 A | * | 4/2003 |

* cited by examiner

*Primary Examiner* — Jason S Morrow
(74) *Attorney, Agent, or Firm* — Birch, Stewart, Kolasch & Birch, LLP

(57) ABSTRACT

To provide a seat cowl structure of a saddle-riding type vehicle that can reduce weight of a seat cowl support structure, while achieving stiffness to support an occupant load. The seat cowl structure includes a pair of left and right seat rails and a stiffness portion. The pair of left and right seat rails extends rearwardly from a vehicle body frame and is disposed inside a seat cowl. The stiffness portion connects between seat cowl fastening portions of the left and right seat rails in a vehicle width direction and is disposed inside an upper surface portion and side surface portions of the seat cowl.

17 Claims, 8 Drawing Sheets

SEAT COWL STRUCTURE OF SADDLE-RIDING TYPE VEHICLE

CROSS-REFERENCE TO RELATED APPLICATIONS

This application claims priority under 35 U.S.C. §119(a) to Application No. 2009-227598, filed in Japan on Sep. 30, 2009, the entirety of which is expressly incorporated herein by reference.

BACKGROUND OF THE INVENTION

1. Field of the Invention

The present invention relates to a seat cowl structure of a saddle-riding type vehicle.

2. Description of Background Art

A known seat cowl structure of a saddle-riding type vehicle includes side surface portions extending downwardly from either side of a top surface portion that has a seating portion. Each of the side surface portions has a lower edge portion formed from a fibrous material having fiber orientation aligned in a longitudinal direction (see, for example, Japanese Patent Laid-open No. Hei 3-271087).

In the seat cowl structure of the saddle-riding type vehicle disclosed in Japanese Patent Laid-open No. Hei 3-271087, no consideration is given to reduction in weight of a seat cowl support structure, though an occupant load can be supported with enhanced stiffness of the lower edge portions of the side surfaces of the seat cowl.

SUMMARY OF THE INVENTION

The present invention has been made in view of the foregoing situation and it is an object of the present invention to provide a seat cowl structure of a saddle-riding type vehicle that can reduce the weight of a seat cowl support structure, while achieving stiffness to support an occupant load.

To achieve the foregoing object, according to a first aspect of the present invention, a seat cowl structure of a saddle-riding type vehicle has a top surface portion that has a seating portion and extends longitudinally and a pair of left and right side surface portions that extend downwardly from either side of the top surface portion. The seat cowl includes: a pair of left and right seat rails disposed inside the seat cowl, the seat rails extending rearwardly from a vehicle body frame; and a stiffness portion disposed inside the top surface portion and the side surface portions, the stiffness portion connecting between seat cowl fastening portions of the left and right seat rails in a vehicle width direction.

According to a second aspect of the present invention, the stiffness portion is disposed rearwardly of a front end portion of the seating portion of the seat cowl.

According to a third aspect of the present invention, the vehicle includes a fuel tank disposed in a space surrounded by the vehicle body frame, the seat rails, and a rear wheel and the stiffness portion is disposed at a position that overlaps the fuel tank in the vehicle width direction and in a vehicle longitudinal direction.

According to a fourth aspect of the present invention, the fuel tank extends up to a point upward of upper end portions of the seat rails and the stiffness portion.

According to a fifth aspect of the present invention, the fuel tank includes a fuel pump disposed therein and the fuel pump is disposed between the vehicle body frame and the stiffness portion in a vehicle side view.

The seat cowl structure of the saddle-riding type vehicle according to the first aspect of the present invention includes the pair of left and right seat rails disposed inside the seat cowl, the seat rails extending rearwardly from the vehicle body frame and the stiffness portion disposed inside the top surface portion and the side surface portions, the stiffness portion connecting between the seat cowl fastening portions of the left and right seat rails in the vehicle width direction. Stiffness (that which can support an occupant load) of a level equivalent to that achieved by a cross member connecting between the seat cowl fastening portions of the left and right seat rails can be achieved, while holding down the stiffness of the left and right seat rails. In addition, because the stiffness of the left and right seat rails can be held down, the left and right seat rails can be reduced in weight.

According to the second aspect of the present invention, the stiffness portion is disposed rearwardly of the front end portion of the seating portion of the seat cowl. The stiffness portion is therefore disposed at a position away from vehicle body frame mounting portions of the left and right seat rails. This helps hold down the stiffness of the left and right seat rails, so that the left and right seat rails can be reduced in weight.

According to a third aspect of the present invention, the fuel tank is disposed in a space surrounded by the vehicle body frame, the seat rails, and the rear wheel and the stiffness portion is disposed at a position that overlaps the fuel tank in the vehicle width and longitudinal directions. Accordingly, a space formed upward of the left and right seat rails as a result of providing the stiffness portion in the seat cowl and thereby eliminating the cross member that connects between the seat cowl fastening portions of the left and right seat rails can be used, so that a capacity of the fuel tank can be enlarged.

According to the fourth aspect of the present invention, the fuel tank extends up to a point upward of the upper end portions of the seat rails and the stiffness portion. Therefore, an internal space formed inside the seat cowl as a result of providing the stiffness portion in the seat cowl and thereby eliminating the cross member that connects between the fastening portions of the left and right seat rails can be used, so that the capacity of the fuel tank can be enlarged.

According to the fifth aspect of the present invention, the fuel pump installed inside the fuel tank is disposed between the vehicle body frame and the stiffness portion in the vehicle side view. The fuel pump can therefore be disposed longitudinally at a position that has a depth in the fuel tank and is formed by extending the fuel tank up to the point upward of the left and right seat rails. This allows part of fuel in a dead space formed when the fuel pump is placed in a crosswise direction to be used, so that mileage of the vehicle can be extended.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
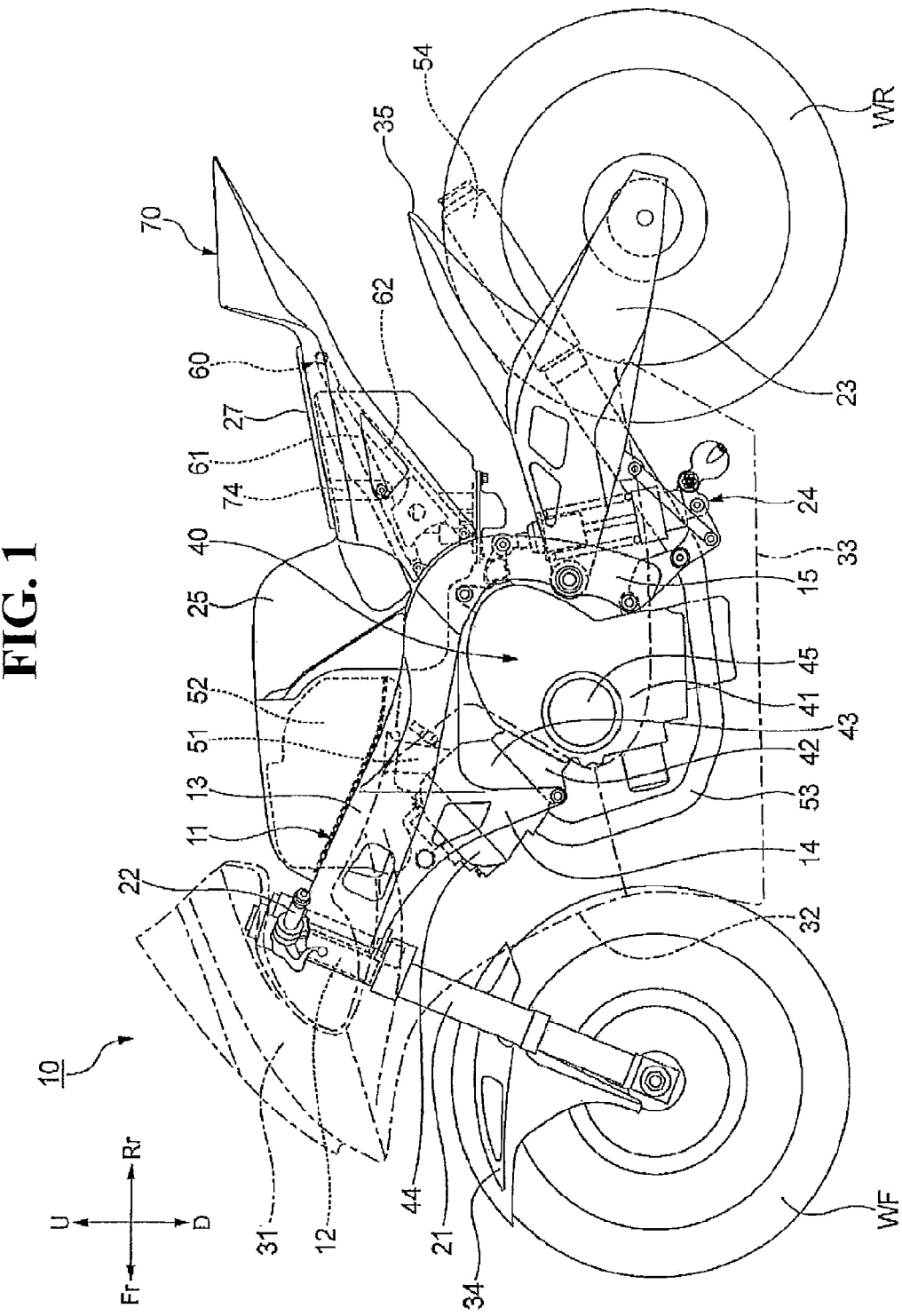
FIG. 1 is a left side elevational view showing a motorcycle in which an embodiment of a seat cowl structure of a saddle-riding type vehicle according to the present invention is incorporated.

The present invention will now be described with reference to the accompanying drawings, wherein the same reference numerals have been used to identify the same or similar elements throughout the several views. The drawings should be viewed in the direction of reference numerals. Throughout the descriptions given hereunder, expressions indicating directions including front and rear, right and left, and up and down, mean the same directions as those as viewed from a rider. In the drawings, an arrow Fr indicates forward of the vehicle, an arrow Rr indicates rearward of the vehicle, an arrow L indicates leftward of the vehicle, an arrow R indicates rightward of the vehicle, an arrow U indicates upward of the vehicle, and an arrow D indicates downward of the vehicle.

A motorcycle 10 of a saddle-riding type vehicle according to the embodiment of the present invention includes, as shown in FIG. 1, a vehicle body frame 11 and an engine 40. The vehicle body frame 11 includes a head pipe 12, a pair of left and right main frames 13, a pair of left and right engine hangers 14, and a pair of left and right pivot plates 15. Specifically, the head pipe 12 is disposed at a front end of the vehicle body frame 11. The main frames 13 extend rearwardly and downwardly from the head pipe 12. The engine hangers 14 extend downwardly from lower surfaces of front portions of the main frames 13. The pivot plates 15 are connected to, and extend downwardly from, rear end portions of the main frames 13. The engine 40 that is disposed downwardly of the main frames 13 is mounted on the engine hangers 14 and the pivot plates 15.

In addition to the abovementioned parts, the motorcycle 10 further includes a front fork 21, a front wheel WF, a steering handlebar 22, a swing arm 23, a rear wheel WR, a rear wheel suspension system 24, a fuel tank 25, a rear frame 60, a seat cowl 70, and a rider's seat 27. Specifically, the front fork 21 is steerably supported by the head pipe 12. The front wheel WF is rotatably supported at a lower end portion of the front fork 21. The handlebar 22 is disposed at an upper end portion of the front fork 21. The swing arm 23 is swingably supported by the pivot plate 15. The rear wheel WR is rotatably supported at a rear end portion of the swing arm 23. The rear wheel suspension system 24 is disposed between the swing arm 23 and the pivot plate 15. The fuel tank 25 is disposed upwardly of the engine 40 and between the pair of left and right main frames 13. The rear frame 60 is connected to upper portions of the left and right pivot plates 15. The seat cowl 70 is mounted on the rear frame 60. The rider's seat 27 that serves as a seating portion is disposed on the seat cowl 70. Referring to FIG. 1, reference numeral 31 identifies a front cowl; reference numeral 32 identifies a front side cowl; reference numeral 33 identifies an under cowl; reference numeral 34 identifies a front fender; and reference numeral 35 identifies a rear fender.

Referring to FIG. 1, the engine 40 has an outer shell that mainly includes a crankcase 41, a cylinder block 42, a cylinder head 43, a cylinder head cover 44, a generator cover 45, and a clutch cover. Specifically, the cylinder block 42 is disposed at a forward upper end portion of the crankcase 41. The cylinder head 43 is disposed at an upper end portion of the cylinder block 42. The cylinder head cover 44 is disposed at an upper end portion of the cylinder head 43. The generator cover 45 is disposed on a left side surface of the crankcase 41. The clutch cover not shown is disposed on a right side surface of the crankcase 41.

Referring further to FIG. 1, an air cleaner 52 is connected via a throttle body 51 to an intake port not shown formed at a rear portion of the cylinder head 43. Further, a muffler 54 is connected via an exhaust pipe 53 to an exhaust port not shown formed at a front portion of the cylinder head 43.

Referring to FIGS. 2 through 6, the rear frame 60 includes a pair of left and right seat rails 61, a pair of left and right sub-frames 62, a cross member 63, and a pair of left and right reinforcement plates 64. Specifically, the left and right seat rails 61 are connected to upper portions of the left and right pivot plates 15, respectively, and extend rearwardly and upwardly. The left and right sub-frames 62 are connected to the upper portions of the left and right pivot plates 15, respectively, and extend rearwardly and upwardly. The sub-frames 62 have their rear end portions connected to rear end portions of the seat rails 61. The cross member 63 connects between the rear end portions of the seat rails 61 in a vehicle width direction. Each of the left and right reinforcement plates 64 connects between front portions of corresponding ones of the seat rails 61 and the sub-frames 62 in a vertical direction. The rear frame 60 is disposed inside the seat cowl 70.

The left and right seat rails 61 and the cross member 63 include seat cowl fastening portions 65 that are configured to mount the seat cowl 70 thereon. The seat cowl fastening portions 65 are disposed on outer side surfaces in the vehicle width direction at intermediate portions of the left and right seat rails 61 and on upper surfaces on either end of the cross member 63. In addition, the left and right seat rails 61 and the left and right sub-frames 62 include frame mounting portions 66 to be connected to the left and right pivot plates 15, respectively. The frame mounting portions 66 are disposed at front end portions of the seat rails 61 and the sub-frames 62.

Referring to FIGS. 2, 3, 7, and 8, the seat cowl 70 includes an upper surface portion 71 and a pair of left and right side surface portions 72. Specifically, the upper surface portion 71 extends longitudinally along the vehicle, on which the rider's seat 27 is mounted. The side surface portions 72 extend downwardly from either side of the upper surface portion 71.

The upper surface portion 71 and the left and right side surface portions 72 of the seat cowl 70 include screw insertion portions 73 formed therein, through which mounting screws 80 for mounting the seat cowl 70 on the rear frame 60 are passed. The screw insertion portions 73 are disposed at positions in the upper surface portion 71 that correspond to the seat cowl fastening portions 65 of the cross member 63 and positions in the side surface portions 72 that correspond to the seat cowl fastening portions 65 of the left and right seat rails 61.

Figure 7:
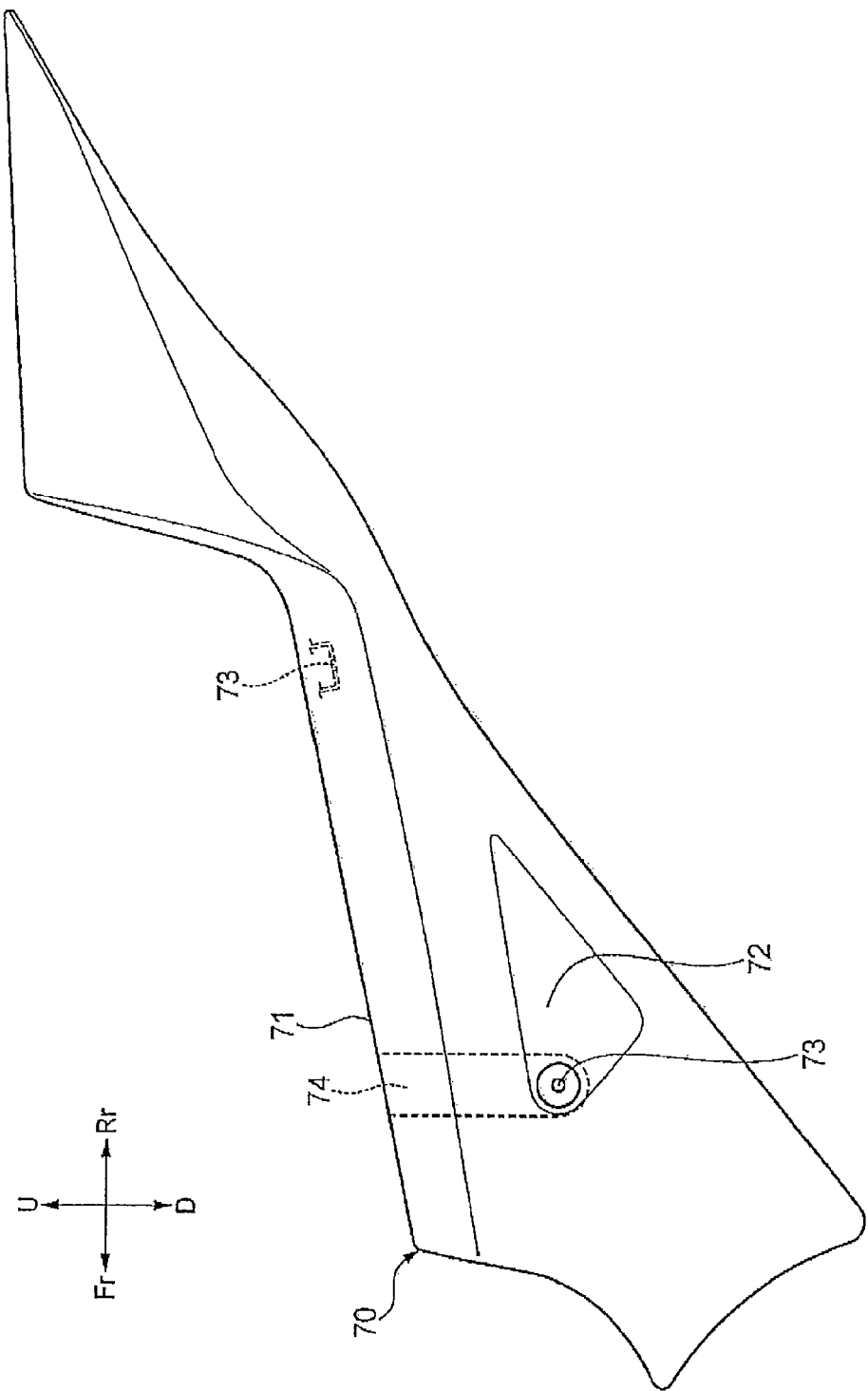
FIG. 7 is a left side elevational view showing the seat cowl.
Figure 8:
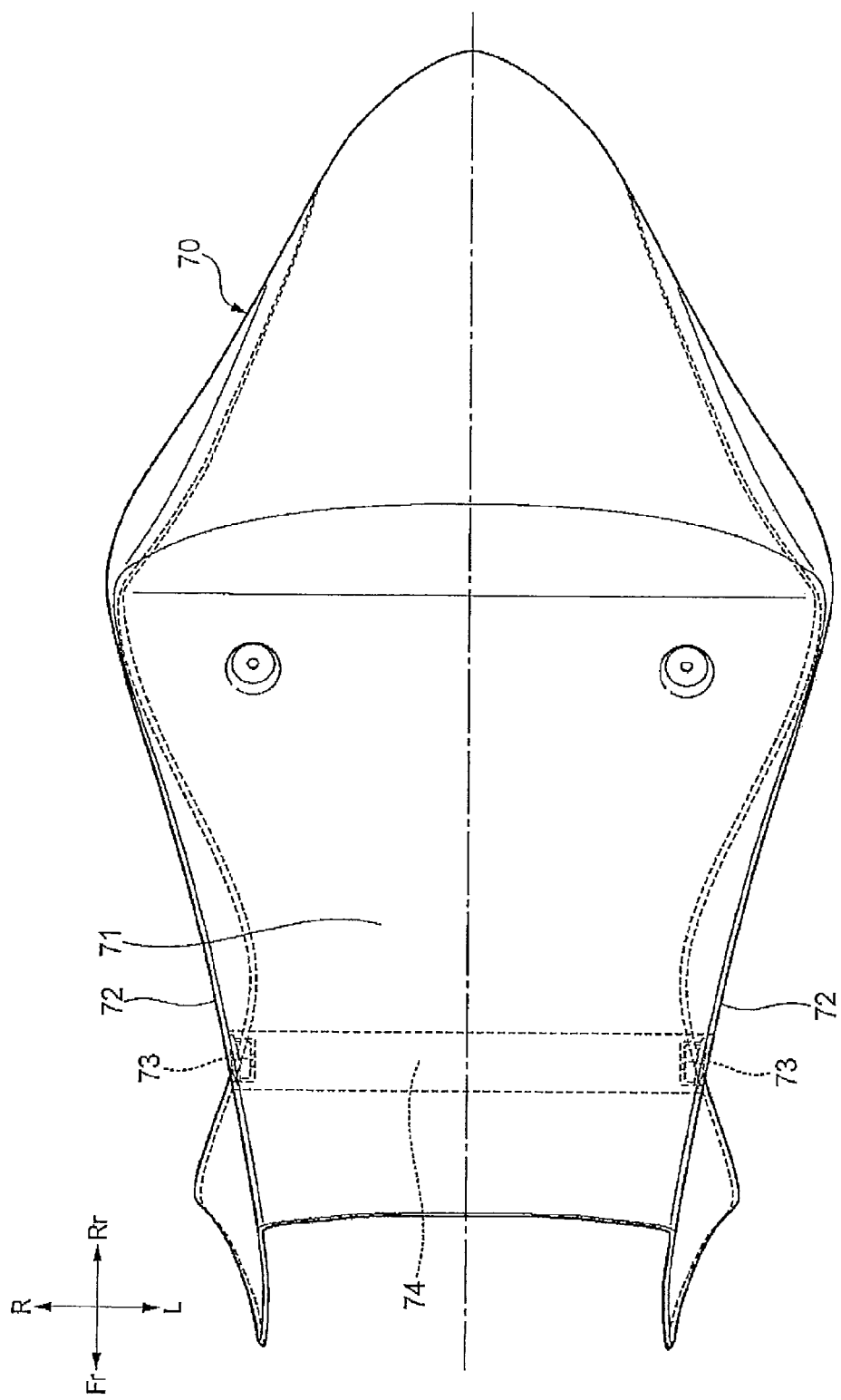
FIG. 8 is a plan view showing the seat cowl.

In accordance with the embodiment of the present invention, referring to FIGS. 7 and 8, a band-like stiffness portion 74 is formed on inner side surfaces of the upper surface portion 71 and the left and right side surface portions 72 of the seat cowl 70. The stiffness portion 74 connects between the seat cowl fastening portions 65, 65 of the left and right seat rails 61 in the vehicle width direction. The stiffness portion 74 is formed by increasing a wall thickness of each of the upper surface portion 71 and the side surface portions 72 on the inside of the seat cowl 70.

Figure 2:
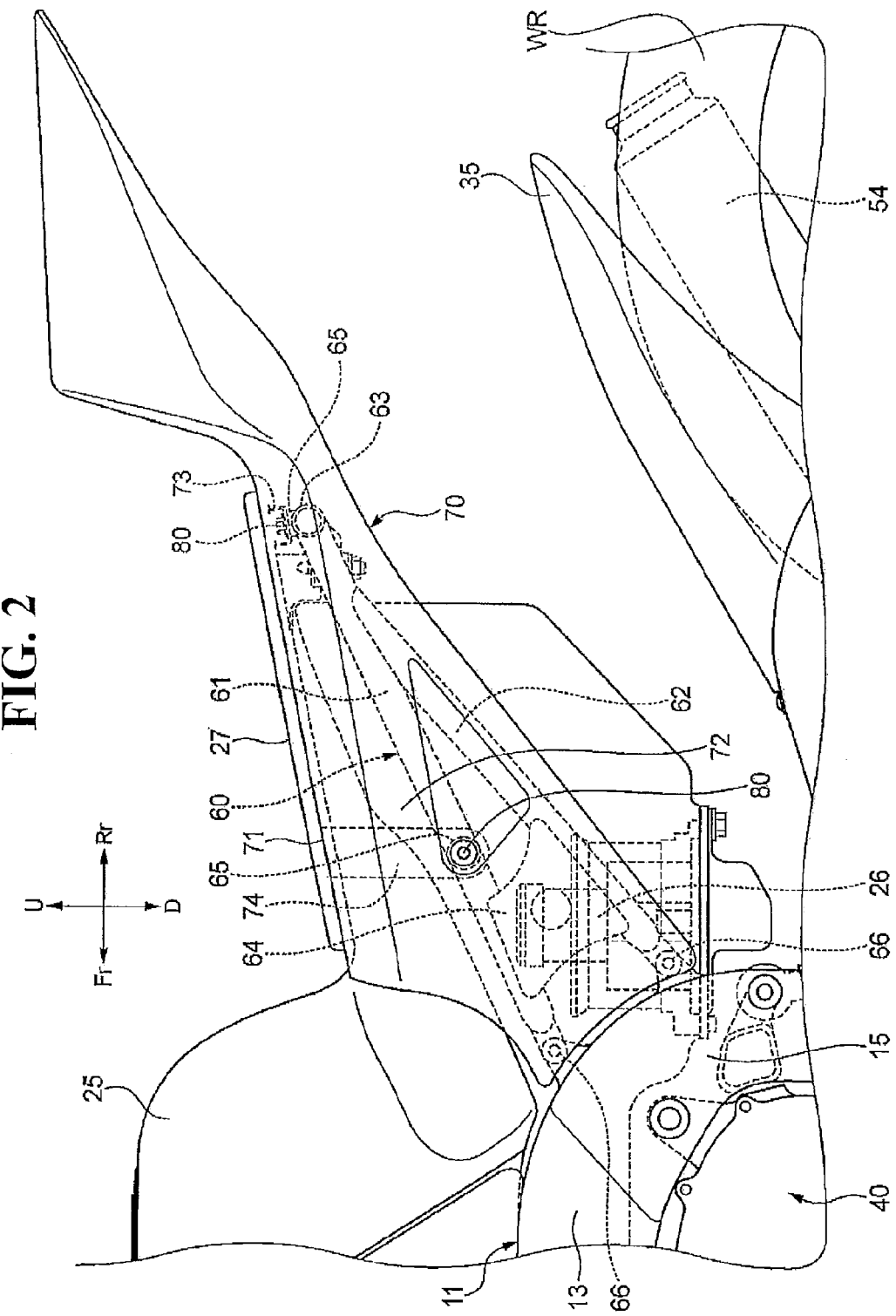
FIG. 2 is an enlarged left side elevational view showing parts around a seat cowl shown in FIG. 1.
Figure 3:
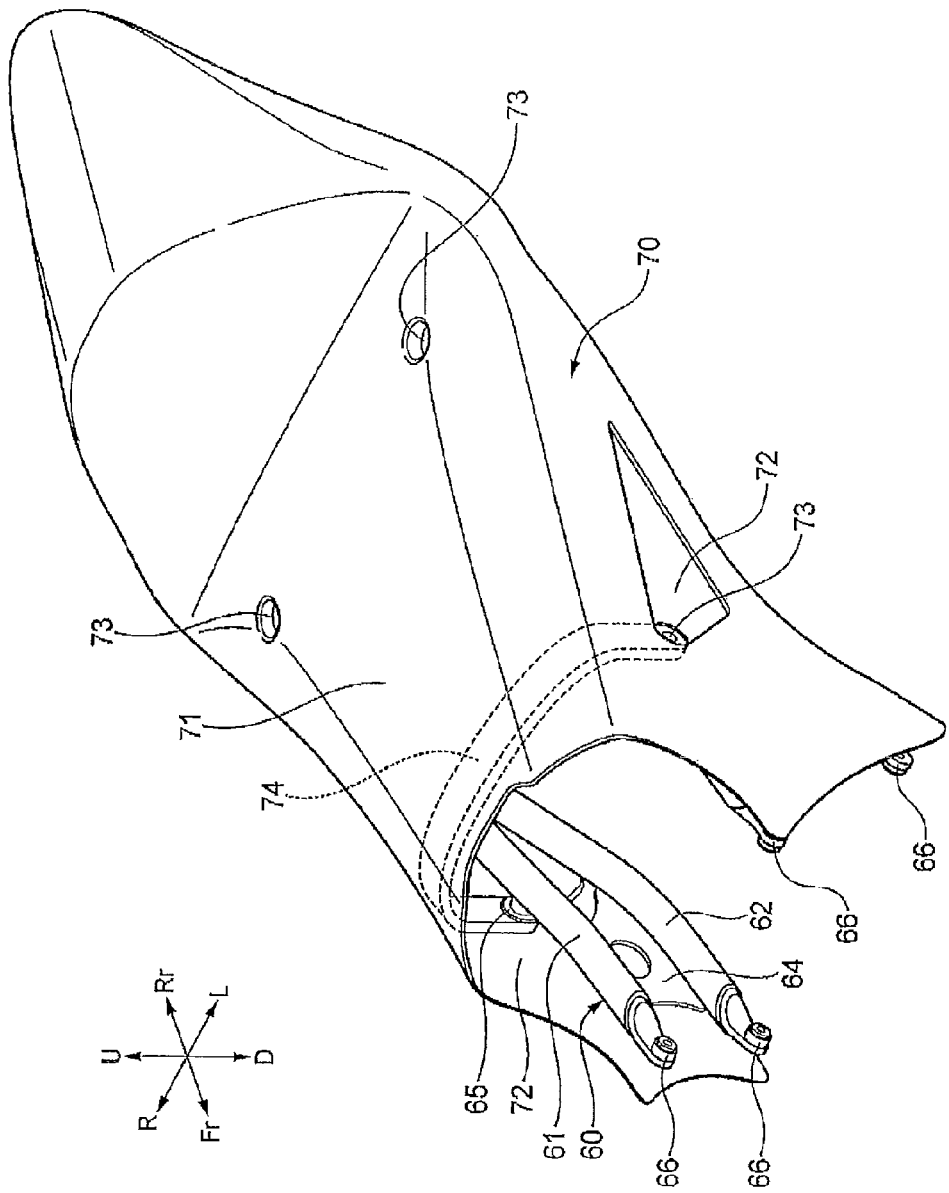
FIG. 3 is a perspective view showing a rear frame and the seat cowl shown in FIG. 2.
Figure 4:
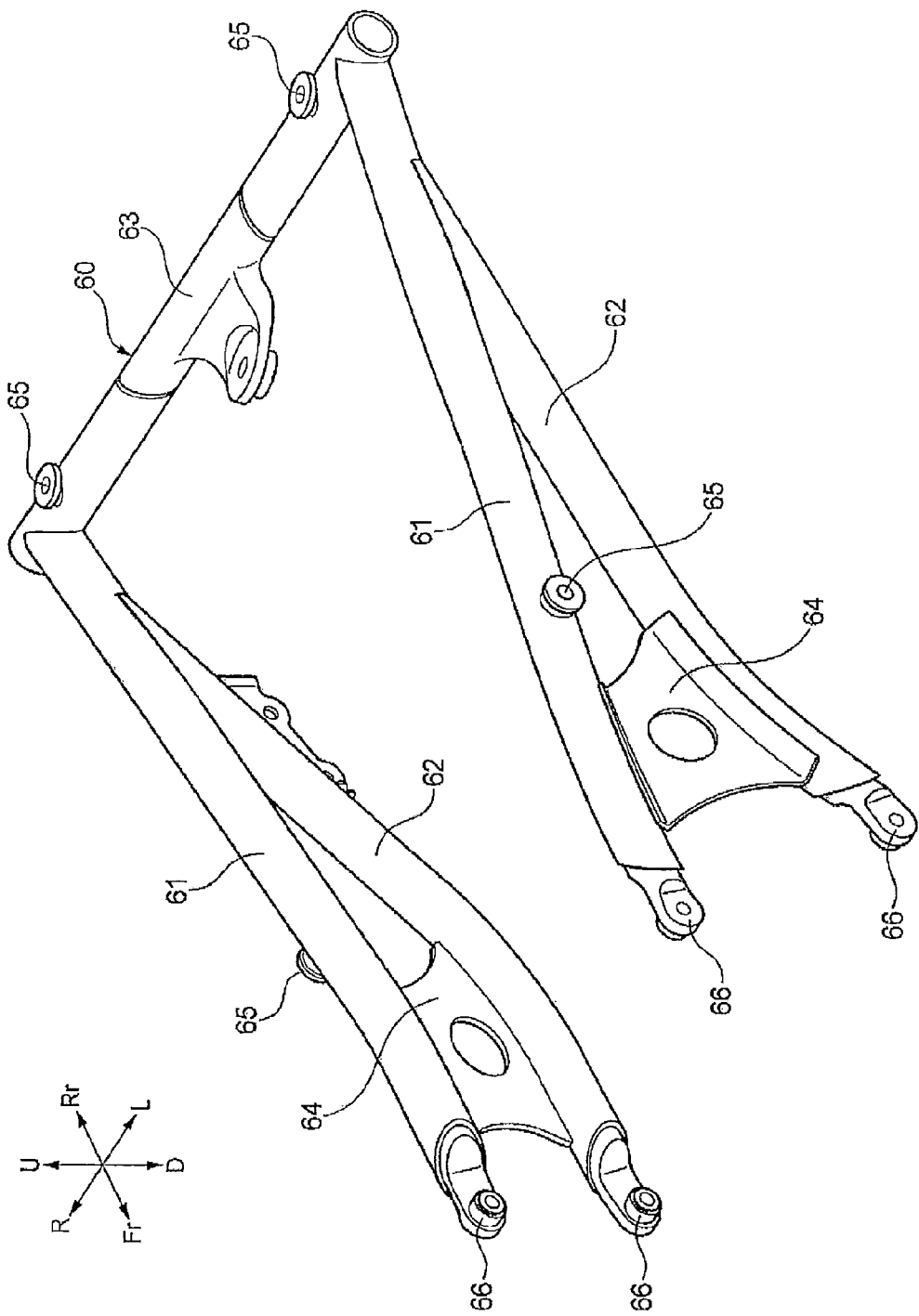
FIG. 4 is a perspective view showing the rear frame as viewed from a forward direction.
Figure 5:
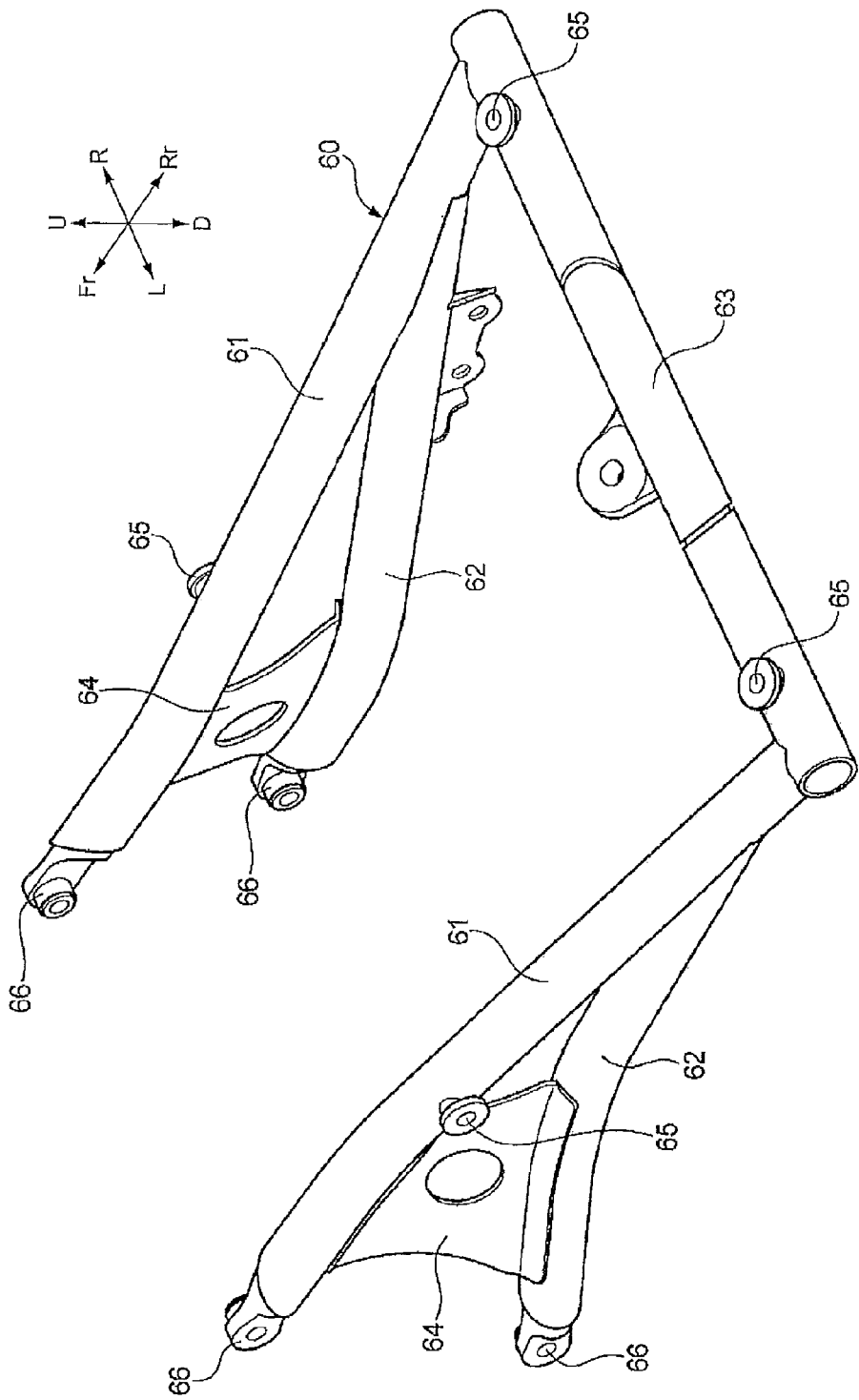
FIG. 5 is a perspective view showing the rear frame as viewed from a rearward direction.
Figure 6:
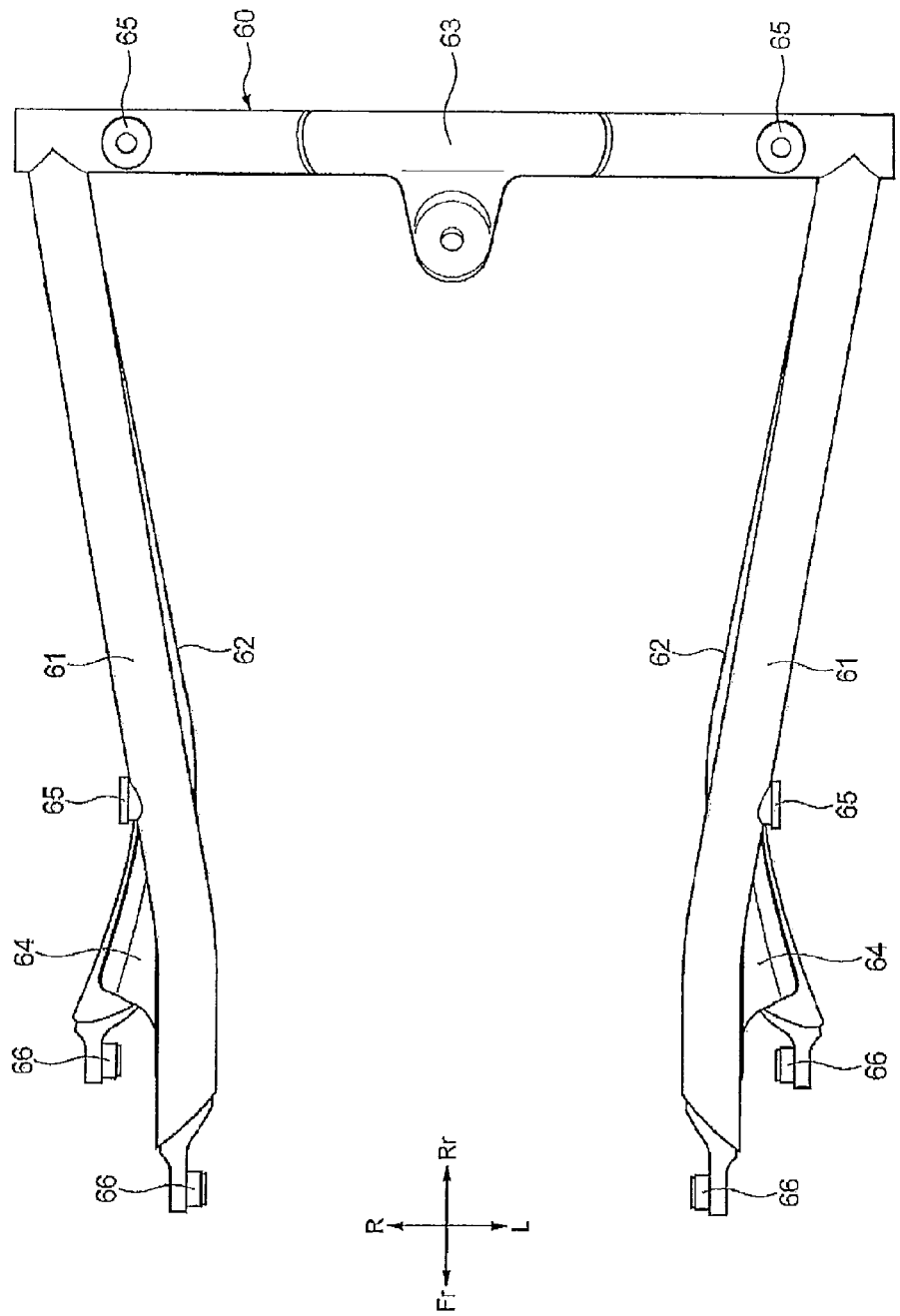
FIG. 6 is a plan view showing the rear frame.

Additionally, in accordance with the embodiment of the present invention, referring to FIG. 2, the stiffness portion 74 is disposed rearwardly of a front end portion of the rider's seat 27.

Additionally, in accordance with the embodiment of the present invention, referring to FIGS. 1 and 2, the fuel tank 25 is disposed in a space surrounded by the vehicle body frame 11, the seat rails 61, and the rear wheel WR. The stiffness portion 74 is disposed at a position that overlaps the fuel tank 25 in the vehicle width and longitudinal directions. In addition, the fuel tank 25 has a rear end portion extending up to a point that is upward of upper end portions of the seat rails 61 and the stiffness portion 74.

Additionally, in accordance with the embodiment of the present invention, referring to FIG. 2, the fuel tank 25 has a fuel pump 26 installed therein. The fuel pump 26 is disposed between an upper portion of the pivot plate 15 and the stiffness portion 74 in a vehicle side view.

As described heretofore, in the seat cowl structure according to the embodiment of the present invention, the left and right seat rails 61 extending rearwardly from the vehicle body frame 11 are disposed inside the seat cowl 70 and the stiffness portion 74 that connects between the seat cowl fastening portions 65, 65 of the left and right seat rails 61 in the vehicle width direction is disposed inside the upper surface portion 71 and the side surface portions 72 of the seat cowl 70. Therefore, stiffness (that which can support an occupant load) of a level equivalent to that achieved by a cross member connecting between the seat cowl fastening portions 65, 65 of the left and right seat rails 61 can be achieved, while holding down the stiffness of the left and right seat rails 61. In addition, because the stiffness of the left and right seat rails 61 can be held down, the left and right seat rails 61 can be reduced in weight.

In the seat cowl structure according to the embodiment of the present invention, the stiffness portion 74 is disposed rearwardly of the front end portion of the rider's seat 27. The stiffness portion 74 is therefore disposed at a position away from the frame mounting portions 66 of the left and right seat rails 61. This helps hold down the stiffness of the left and right seat rails 61, so that the left and right seat rails 61 can be reduced in weight.

Additionally, in the seat cowl structure according to the embodiment of the present invention, the fuel tank 25 is disposed in a space surrounded by the vehicle body frame 11, the seat rails 61, and the rear wheel WR and the stiffness portion 74 is disposed at a position that overlaps the fuel tank 25 in the vehicle width and longitudinal directions. Accordingly, a space formed upward of the left and right seat rails 61 as a result of providing the stiffness portion 74 in the seat cowl 70 and thereby eliminating the cross member that connects between the seat cowl fastening portions 65, 65 of the left and right seat rails 61 can be used, so that a capacity of the fuel tank 25 can be enlarged.

Additionally, in the seat cowl structure according to the embodiment of the present invention, the fuel tank 25 extends up to a point upward of the upper end portions of the seat rails 61 and the stiffness portion 74. Therefore, an internal space formed inside the seat cowl 70 as a result of providing the stiffness portion 74 in the seat cowl 70 and thereby eliminating the cross member that connects between the seat cowl fastening portions 65, 65 of the left and right seat rails 61 can be used, so that the capacity of the fuel tank 25 can be enlarged.

Additionally, in the seat cowl structure according to the embodiment of the present invention, the fuel pump 26 installed inside the fuel tank 25 is disposed between the upper portion of the pivot plate 15 and the stiffness portion 74 in the vehicle side view. The fuel pump 26 can therefore be disposed longitudinally at a position that has a depth in the fuel tank 25 and is formed by extending the fuel tank 25 up to the point upward of the left and right seat rails 61. This allows part of fuel in a dead space formed when the fuel pump 26 is placed in a crosswise direction to be used, so that mileage of the motorcycle 10 can be extended.

While the present invention has been particularly shown and described with reference to the preferred embodiment, it should be understood that the present invention is not limited to the above-described embodiment and various changes in form and detail may be made therein without departing from the spirit and scope of the invention.

For example, in the above-described embodiment, the cross member 63 connects between the rear end portions of the left and right seat rails 61. The cross member 63 may nonetheless be omitted, because the stiffness portion 74 of the seat cowl 70 ensures stiffness. This further promotes reduction in weight of the left and right seat rails 61.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat cowl structure of a saddle-riding type vehicle, comprising:
    a seat cowl, said seat cowl having a top surface portion that has a seating portion and extends longitudinally and a pair of left and right side surface portions that extend downwardly from either side of the top surface portion;
    a pair of left and right seat rails disposed inside the seat cowl, the seat rails extending rearwardly from a vehicle body frame; and
    a stiffness portion disposed inside the top surface portion and the side surface portions, the stiffness portion connecting between seat cowl fastening portions of the left and right seat rails in a vehicle width direction.

2. The seat cowl structure according to claim 1, wherein the stiffness portion is disposed rearwardly of a front end portion of the seating portion of the seat cowl.

3. The seat cowl structure according to claim 1, the vehicle including:
    a fuel tank disposed in a space surrounded by the vehicle body frame, the seat rails, and a rear wheel, wherein
    the stiffness portion is disposed at a position that overlaps the fuel tank in the vehicle width direction and in a vehicle longitudinal direction.

4. The seat cowl structure according to claim 3, wherein the fuel tank extends up to a point upward of upper end portions of the seat rails and the stiffness portion.

5. The seat cowl structure according to claim 3, wherein the fuel tank includes a fuel pump disposed therein; and the fuel pump is disposed between the vehicle body frame and the stiffness portion in a vehicle side view.

6. The seat cowl structure according to claim 1, wherein said stiffness portion is formed by increasing a wall thickness of each of the top surface portion and the side surface portions on the inside of the seat cowl.

7. The seat cowl structure according to claim 6, wherein a seat is mounted on the seating portion of the top surface of the seat cowl, and the stiffness portion is disposed rearwardly of a front end portion of the seat.

8. The seat cowl structure according to claim 1, wherein the pair of left and right seat rails are connected to each other at a rear end thereof by a cross member.

9. The seat cowl structure according to claim 1, wherein the pair of left and right seat rails are not connected to each other at a rear end thereof by a cross member.

10. A seat cowl for a saddle-riding type vehicle, comprising:
   a seat cowl body, said seat cowl body having a top surface portion that has a seating portion and extends longitudinally and a pair of left and right side surface portions that extend downwardly from either side of the top surface portion, each of the pair of left and right side surface portions including screw insertion portions for receiving screws to be threaded into seat cowl fastening portions of left and right seat rails; and
   a stiffness portion disposed inside the top surface portion and the side surface portions, the stiffness portion extending from and between the screw insertion portions in a vehicle width direction.

11. A seat cowl for a saddle-riding type vehicle, comprising:
   a seat cowl body, said seat cowl body having a top surface portion that has a seating portion and extends longitudinally and a pair of left and right side surface portions that extend downwardly from either side of the top surface portion, each of the pair of left and right side surface portions including screw insertion portions for receiving screws to be threaded into seat cowl fastening portions of left and right seat rails; and
   a stiffness portion disposed inside of the top surface portion and the side surface portions, the stiffness portion extending from and between the screw insertion portions,
   wherein the stiffness portion is disposed rearwardly of a front end portion of the seating portion of the seat cowl body.

12. A seat cowl for a saddle-riding type vehicle, comprising:
   a seat cowl body, said seat cowl body having a top surface portion that has a seating portion and extends longitudinally and a pair of left and right side surface portions that extend downwardly from either side of the top surface portion, each of the pair of left and right side surface portions including screw insertion portions for receiving screws to be threaded into seat cowl fastening portions of left and right seat rails; and
   a stiffness portion disposed inside of the top surface portion and the side surface portions, the stiffness portion extending from and between the screw insertion portions,
   wherein the vehicle includes a fuel tank disposed in a space surrounded by a vehicle body frame, the seat rails, and a rear wheel, and wherein the stiffness portion is disposed at a position that overlaps the fuel tank in the vehicle width direction and in a vehicle longitudinal direction when the seat cowl is mounted to the pair of left and right seat rails.

13. The seat cowl according to claim 12, wherein the fuel tank extends up to a point upward of upper end portions of the seat rails and the stiffness portion when the seat cowl is mounted to the pair of left and right seat rails.

14. The seat cowl according to claim 12, wherein the fuel tank includes a fuel pump disposed therein; and the fuel pump is disposed between the vehicle body frame and the stiffness portion in a vehicle side view when the seat cowl is mounted to the pair of left and right seat rails.

15. The seat cowl according to claim 10, wherein said stiffness portion is formed by increasing a wall thickness of each of the top surface portion and the side surface portions on the inside of the seat cowl.

16. The seat cowl according to claim 10, wherein the stiffness portion is in physical contact with the seat cowl fastening portions of the left and right seat rails.

17. The seat cowl according to claim 10, wherein the stiffness portion is disposed within an inner space formed by a combination of an inner surface of the top surface portion and of the side surface portions.

* * * * *